United States Patent
Akiyama et al.

(10) Patent No.: US 6,391,435 B1
(45) Date of Patent: May 21, 2002

(54) REINFORCING BAMBOO FIBER, MANUFACTURING METHOD THEREOF, INORGANIC MOLDED BODY USING REINFORCING BAMBOO FIBER, AND MANUFACTURING METHOD THEREOF

(75) Inventors: Norihito Akiyama; Shoichiro Irie, both of Yokohama (JP)

(73) Assignee: A & A Material Corporation, Tokyo (JP)

( * ) Notice: Subject to any disclaimer, the term of this patent is extended or adjusted under 35 U.S.C. 154(b) by 0 days.

(21) Appl. No.: 09/534,398

(22) Filed: Mar. 24, 2000

Related U.S. Application Data (62) Division of application No. 08/677,806, filed on Jul. 10, 1996, now Pat. No. 6,086,804.

(51) Int. Cl.[7] .............................................. B32B 17/12
(52) U.S. Cl. ......................... 428/293.7; 241/20; 241/28
(58) Field of Search ................. 428/221, 222, 428/293.7; 241/28, 20, 29

(56) References Cited

U.S. PATENT DOCUMENTS

| | | |
|---|---|---|
| 2,929,756 A | 3/1960 | Schuh |
| 3,216,886 A | 11/1965 | Katzen |
| 4,406,703 A | 9/1983 | Guthrie et al. |
| 4,641,792 A | 2/1987 | Villavicencio et al. |
| 5,021,093 A | 6/1991 | Beshay |
| 5,167,710 A | 12/1992 | Leroux et al. .............. 106/688 |
| 5,178,335 A | 1/1993 | Mertens ........................ 241/73 |
| 5,393,214 A * | 2/1995 | Irie et al. .................... 425/81.1 |
| 5,397,067 A * | 3/1995 | Akiyama et al. ............. 241/28 |
| 5,403,087 A * | 4/1995 | Irie et al. ...................... 366/66 |
| 5,415,821 A * | 5/1995 | Irie et al. .................... 264/113 |
| 5,433,805 A | 7/1995 | Schmidmeier |

FOREIGN PATENT DOCUMENTS

| | | |
|---|---|---|
| GB | 213003 | 3/1924 |
| GB | 2268515 | 1/1994 |
| GB | 2268517 | 1/1994 |
| JP | 06315908 | 11/1994 |
| JP | 06315909 | 11/1994 |
| JP | 06315912 | 11/1994 |
| JP | 7-173633 | 7/1995 |

* cited by examiner

*Primary Examiner*—Merrick Dixon
(74) *Attorney, Agent, or Firm*—Oblon, Spivak, McClelland, Maier & Neustadt, P.C.

(57) ABSTRACT

Bamboo fibers are utilized to serve as a reinforcing material and for manufacturing an inorganic molded body. In order to produce the bamboo fibers with excellent durability, in a first step bamboo material is compressed to be roughly crushed and in a second step the roughly crushed bamboo material is fiberized using a grinding machine. The moisture content of the bamboo material subjected to the first step is set to be more than 65%. After the completion of at least one of the first and second steps a drying step is taken so that the moisture content of the bamboo material is adjusted to within the range of 3 to 35%.

19 Claims, 3 Drawing Sheets

REINFORCING BAMBOO FIBER, MANUFACTURING METHOD THEREOF, INORGANIC MOLDED BODY USING REINFORCING BAMBOO FIBER, AND MANUFACTURING METHOD THEREOF

This application is a division of Ser. No. 08/677,806, filed Jul. 10, 1996, now U.S. Pat. No. 6,086,804.

BACKGROUND OF THE INVENTION

1. Field of the Invention

The present invention relates to reinforcing bamboo fibers, a method of producing the reinforcing bamboo fibers, an inorganic molded body using reinforcing bamboo fibers, and a method of producing the inorganic molded body.

2. Description of the Prior Art

For production of a wood-based inorganic molded body, as a rule, a woody raw material, i.e., processed wood article such as wood flakes, excelsior and wood fibers, an inorganic hydraulic setting bonding agent such as various types of cement, hydraulic setting gypsum, and water are mixed and kneaded, before being formed into a given shape and subsequently cured and hardened.

For making the woody raw materials, various kinds of conifers and broad-leaved trees have come into widespread use, while bamboo materials have also been proposed as being used for the woody raw materials. Bamboo materials are full of promise as a resource, for bamboo grows faster than the conifers and broad-leaved trees. In addition, bamboo materials are also more desirable as the woody raw material because of their toughness and elasticity. However, bamboo has heretofore been used only in the form of bamboo fibers substituted for wood fibers or wood flakes, which does not sufficiently demonstrate the toughness and elasticity features of bamboo materials.

The present inventors have developed a technique to use a bamboo material as a woody raw material for a wood-based inorganic molded body, and more particularly a method of producing a wood-based inorganic board wherein a woody raw material, an inorganic hydraulic setting bonding agent and water are mixed and kneaded, before the resultant mixture is formed into a given shape and subsequently the inorganic hydraulic setting bonding agent is cured and hardened.

Japanese Patent Laid-Open No. 2-26854 discloses a method of production wherein the bamboo material absorbs water to reach a moisture content more than 100% before undergoing a dehydration process to reduce water content more than 50%.

In addition, Japanese Patent Laid-Open No. 2-48446 discloses a method of producing a wood-based inorganic board wherein a woody raw material, an inorganic hydraulic setting bonding agent and water are mixed and kneaded before the resultant mixture is formed into a given shape and subsequently the inorganic hydraulic setting bonding agent is cured and hardened, which is characterized by using, as a woody raw material, wood fibers or wood flakes subjected to epidermis removal.

The techniques as disclosed in these patent applications have been developed with a view to improving compactibility coupled with preventing spring back in production of the inorganic board including the bamboo fibers as the raw material, but not towards making the most of the toughness and elasticity of the bamboo materials.

Moreover, Japanese Patent Laid-Open No. 4-46046 discloses a wood-based inorganic molded body obtained through processes in which a woody raw material, an inorganic hydraulic setting bonding agent and water are mixed and kneaded, before the resultant mixture is formed into a given shape, then cured and hardened. More specifically, this application discloses a bamboo fiber reinforced inorganic molded body characterized in that the woody raw material comprises fibers obtained by defiberizing a bamboo material in the longitudinal direction and having an average length of above 20 cm and an average diameter of below 3 mm, and further discloses a bamboo fiber reinforced inorganic molded body characterized in that the woody raw material comprises fibers obtained by defiberizing a bamboo material in the longitudinal direction and including more than 60% by dry weight of long-fiber components whose lengths are above 20 cm and whose average diameter is below 3 mm and more than 5% by dry weight of short-fiber components whose lengths are below 1 cm and whose average diameter is below 2 mm.

Japanese Patent Laid-Open No. 4-216007 discloses a bamboo fiber manufacturing method comprising a first step of roughly crushing a bamboo material with a rolling machine in a bamboo growing direction and a second step of feeding the bamboo material processed in the first step through feeding rollers into a defiberizing apparatus equipped with a rotary drum having a number of toothed portions so as to defiberize the bamboo material.

Japanese Patent Laid-Open No. 5-138617 discloses a bamboo fiber manufacturing method comprising a first step of roughly crushing a bamboo material with a rolling machine in a bamboo growing direction, a second step of defiberizing the bamboo material processed in the first step with a pickering machine, and a third step of thinning the bamboo material processed in the second step with a turbo mill.

Japanese Patent Laid-Open No. 6-15616 discloses a bamboo fiber manufacturing method comprising a first step of roughly crushing a bamboo material with a rolling machine in the direction of bamboo growth, a second step of fiberizing the roughly crushed material processed in the first step using a hammermill type grinder with a specific mechanism, and a third step of separating inner thin skin portion of the bamboo material, from the fibers obtained in the second step.

When the bamboo fiber reinforces inorganic molded body is actually manufactured using the bamboo fibers produced in accordance with the methods noted in the foregoing patent applications, it has been found that performance can deteriorate to a considerable extent with the passage of time.

In addition, Japanese Patent Laid-Open No. 6-315908 discloses a method of modifying the quality of a raw woody material by using a drying-by-heating quality-modifying furnace. This method comprises the steps of: making a loop of green wood such as lumber or bamboo with a large moisture content and if needed, additionally processing it to make a processed article, such as a half-processed article or a formed article; and subsequently drying and quality-modifying the article in the drying-by-heating quality-modifying furnace so that the article develops a given degree of drying corresponding to 3 to 16% moisture content and so that various components other than moisture originally contained in the green wood are evenly distributed into all tissues.

Japanese Patent Laid-Open No. 6-315912 also discloses a method of modifying the quality of a raw woody material by using a drying-by-heating quality-modifying furnace. This method is composed of the steps of: making a loop of green wood such as lumber or bamboo with a large moisture content and, if needed, additionally processing it to make a processed article, such as a half-processed article or a formed article; and subsequently drying and quality-modifying the article in the drying-by-heating quality-modifying furnace so that the article undergoes a given degree of drying corresponding to 15 to 25% moisture content and so that various components other than moisture originally contained in the green wood are evenly distributed into all tissues.

These patent applications suggest techniques to adjust the moisture content of bamboo materials, but do not teach any detailed embodiment related to the moisture adjustment of the bamboo material or any detailed effects exhibited. In addition, these patent applications do not teach or suggest the method of adjusting moisture content and the effects demonstrated.

SUMMARY OF THE INVENTION

It is therefore an object of the present invention to provide a reinforcing bamboo fiber with high durability, a method of producing the fibers, and an inorganic molded body employing the fibers.

For this purpose, in accordance with the present invention, method (1) of producing reinforcing bamboo fibers is provided comprising a first step of compressing a bamboo material to roughly crush it, and a second step of fiberizing the roughly crushed bamboo material using a grinding machine, wherein the moisture content of the bamboo material in the first step is above 65% and, after the completion of at least one of the first step and the second step a drying step is taken so that the moisture content of the bamboo material is adjusted to within a range of 3 to 35%.

In addition, a method (2) of producing reinforcing bamboo fibers is provided comprising a first step of compressing a bamboo material to roughly crush it, a second step of fiberizing the roughly crushed bamboo material using a grinding machine, and a third step of removing the inner thin skin portion of the bamboo material in accordance with a mechanical separating technique, wherein the moisture content of the bamboo material in the first step is above 65% and, after the completion of at least one of the first step, the second step and the third step, a drying step is taken so that the moisture content of the bamboo material is adjusted to be within a range of 3 to 35%.

Moreover, a method (3) of producing reinforcing bamboo fibers is provided comprising a first step of compressing a bamboo material to roughly crush it, a second step of fiberizing the roughly crushed bamboo material using a grinding machine, and a third step of removing the inner thin skin portion of the bamboo material in accordance with a water-immersion separating technique, wherein the moisture content of the bamboo material in the first step is above 65% and, after the completion of at least one of the first step and the second step, a drying step is taken so that the moisture content of the bamboo material is adjusted to within a range of 3 to 35%.

The present invention relates to the reinforcing bamboo fibers produced in accordance with the foregoing methods.

Further, in accordance with the present invention, there is provided a method of manufacturing a reinforcing bamboo fiber-containing inorganic molded body, wherein a raw material mixture containing an inorganic hydraulic setting bonding agent and reinforcing bamboo fibers produced in accordance with the aforesaid method (1) are kneaded with or without a given amount of water, the resultant kneaded mixture is formed into a given shape, and then cured and hardened.

The present invention relates to the reinforcing bamboo fiber-containing inorganic molded body manufactured by this method.

Further, in accordance with the present invention, there is provided a method of manufacturing a reinforcing bamboo fiber-containing inorganic molded body, wherein a raw material mixture containing an inorganic hydraulic setting bonding agent and reinforcing bamboo fibers produced in accordance with the aforesaid method (2) are kneaded together with a given amount of water, the resultant kneaded mixture is formed into a given shape, and then cured and hardened.

The present invention also relates to the reinforcing bamboo fiber-containing inorganic molded body manufactured by this method.

Further, in accordance with the present invention, there is provided a method of manufacturing a reinforcing bamboo fiber-containing inorganic molded body, wherein a raw material mixture containing an inorganic hydraulic setting bonding agent and reinforcing bamboo fibers produced in accordance with the aforesaid method (3) are kneaded, the resultant kneaded mixture is formed into a given shape, and then cured and hardened.

The present invention also relates to the reinforcing bamboo fiber-containing inorganic molded body manufactured by this method.

DETAILED DESCRIPTION OF THE INVENTION

The present invention is based on the method of producing bamboo fibers disclosed in Japanese Patent Laid-Open No. 6-15616, where a first step is taken to remove leaves from cut own bamboo material and to supply it as is or after the bamboo material has been cut to desired measurements, to a compressing apparatus, thereby crushing the bamboo material roughly. A first feature is that the moisture content of the bamboo material to be provided in the first step is adjusted to be above 65%. If the moisture content of the bamboo material used in the first step is below 65%, the resultant reinforcing bamboo fibers do not exhibit sufficient reinforcing effects and undesirably reduces yield. Further, the compressing apparatus for the first step of the method according to the present invention can be conventional equipment such as rolling type mills and stamping type mills. In addition, the length of the bamboo material must naturally be more than the desired length of the fibers.

In this specification, the moisture content of the bamboo material is defined as follows:

moisture content(%)=(water-containing weight−dry weight)/dry weight×100

A second feature of the method (1) of producing reinforcing bamboo fibers according to the present invention is that a drying step is taken after the completion of at least one of the first step and the second step, with the result that the moisture content of the bamboo material is adjusted to within a range of 3 to 35%.

A second feature of the method (2) of producing reinforcing bamboo fibers according to the present invention is that a drying step is taken after the completion of at least one of the first step, the second step and the third step based on the mechanical separating technique, with the result that the moisture content of the bamboo material is adjusted to within a range of 3 to 35%.

A second feature of the method (3) of producing reinforcing bamboo fibers according to the present invention is that a drying step is taken after the completion of at least one of the first step and the second step, so that the moisture content of the bamboo material at the time of the completion of the second step is adjusted to within a range of 3 to 35%.

If the moisture contest of the bamboo material resulting from the drying step exceeds 35%, there is a possibility that the durability of the inorganic molded body containing the obtained reinforcing bamboo fibers will be lowered. In addition, where the drying step is carried out after the completion of the first step, if the moisture content thereof is less than 3%, in the second step, i.e., in the fiber producing step, the bamboo material will not take on a fiber configuration but will readily turn into a powdered form. However, to facilitate the mixing and kneading processes of the reinforcing bamboo fibers and other raw materials in manufacturing a reinforcing bamboo fiber containing inorganic molded body, the reinforcing bamboo fibers obtained when the drying step is taken at the end of the first step are more preferable to the reinforcing bamboo fibers obtained when the drying step is taken after completion of the second step. This is because the latter has a relative tendency for the bamboo fibers to intertwine to form fiber balls, which makes it difficult to evenly mix them with the other raw materials. Further, it is more preferable that the moisture content lie in the range of 3 to 30%. Moreover, if in the third step a mechanical separating method is employed to remove the inner thin skin portion of the bamboo material, the drying step can be taken at the end of the third step. Although the drying step can also be separately performed after completion of the respective steps, one drying step is more desirable in view of manufacturing costs and the like. In this instance, the drying step for the bamboo material is not limited to any specific method, as various methods such as drying by heat and blow drying may be used.

In one embodiment of a method according to this invention, the second step for fiberizing the roughly crushed bamboo material uses a hammermill type grinding machine with a specific mechanism. As one example of thin grinding machine, a horizontal type grinding machine such as MHM series manufactured by Miike Tekkosho K. K. is known. This grinding machine is equipped with a hammer (of a fixed type or suspended type) having a special configuration and attached to a hammer holder on a main shaft rotatable at a high speed and spaced an adequate distance below the hammer holder. This hammer, rotating at a high speed, imparts an impact cutting action and a crushing action which in turn, work on the roughly crushed bamboo material delivered from a hopper, with the result that the bamboo material is instantaneously crushed and fiberized, The fiberized bamboo material then advances to a screen placed downstream to be arranged in desirable fiber lengths, before being continuously discharged toward to the outside in the form of bamboo fibers. The structure of the aforementioned horizontal type grinding machine has been disclosed in detail in Japanese Utility Model Publication No. 58-8339. Further, if the bamboo material jumps into the second step without passing through the first step, most of the bamboo material will be powdered, with the result that the yield of bamboo fibers will be considerably lowered.

In the method (1) of producing reinforcing bamboo fibers according to the present invention, the moisture content of the bamboo material to be subjected to the first step is set to be above 65% and a drying step is provided after the completion of the first step and/or the second step so that the moisture content of the bamboo material is adjusted to within 3 to 35%. Accordingly, the resultant reinforcing bamboo fibers used as a reinforcing material for an inorganic molded body show less variation with the passage of time and develop better durability than the prior art. Further, when the reinforcing bamboo fibers obtained in accordance with the above-mentioned method are used as a reinforcing material, spring back can occur, so to avoid this spring back, the obtained bamboo fibers are processed to absorb water so as to have more than 100% moisture content, before being dehydrated so that the moisture content falls below 50%. Further, it is preferable that the moisture content after the dehydration be adjusted to be in the range of 50 to 200%.

In the bamboo fibers made through the aforesaid first and second steps or in the bamboo fibers suitably subjected to the adjustment of the moisture content due to the drying process, there are mixed an inner thin skin portion which has been present on the rear surfaces of the bamboo material. If an inorganic molded body is manufactured with this inner thin skin portion containing bamboo fibers and cement, according to experiments the flexural strength of the molded body is lowered by approximately 15% with respect to that of an inorganic molded body using bamboo fibers without the inner thin skin portion.

For this reason, the reinforcing bamboo fiber producing methods (2) and (3) according to the present invention include the third step of separating the mixed inner thin skin portion of bamboo fibers in view of the application of the reinforcing bamboo fibers, the manufacturing cost, and so on. For this third step, (a) a mechanical separating method and (b) a water-immersion separating method are acceptable.

(a) Mechanical Separating Method

Figure 1:
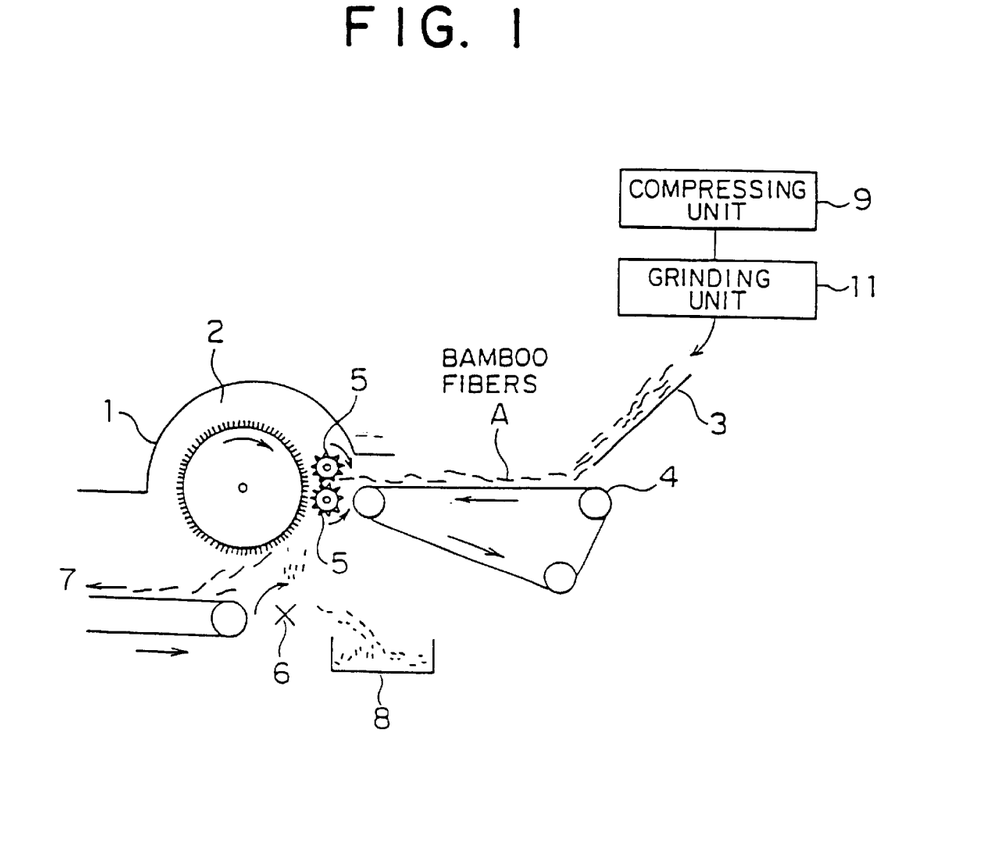
FIG. 1 is an illustration of one example of an apparatus that can be used for separating inner thin skin portions of a bamboo material from bamboo fibers in the third step of one method of producing a reinforcing bamboo fiber according to the present invention.

An apparatus as shown in FIG. 1 for example, is applicable to the mechanical separating method. The FIG. 1 apparatus is based upon a garnet machine. The inner thin skin portion containing bamboo fibers obtained through a compressing unit 9 (first step) and a grinding unit (crusher) 11 (second step) are fed between a pair of feed rollers 5 from a chute 3 through a conveyer 4. Thereafter, the bamboo fibers are discharged from the pair of feed rollers 5 through a number of triangular tooth portions of a rotary drum 2 onto a conveyer 7. The conveyer 7 is located such that its one end only extends close to the vertical center line of the rotary drum 2. With this location, most of the inner thin skin portion drops before reaching the conveyer 7, and are then collected by blades 6 placed at an inner thin skin portion dropping position into a collecting vessel 8.

(b) Water-Immersion Separating Method

Figure 2:
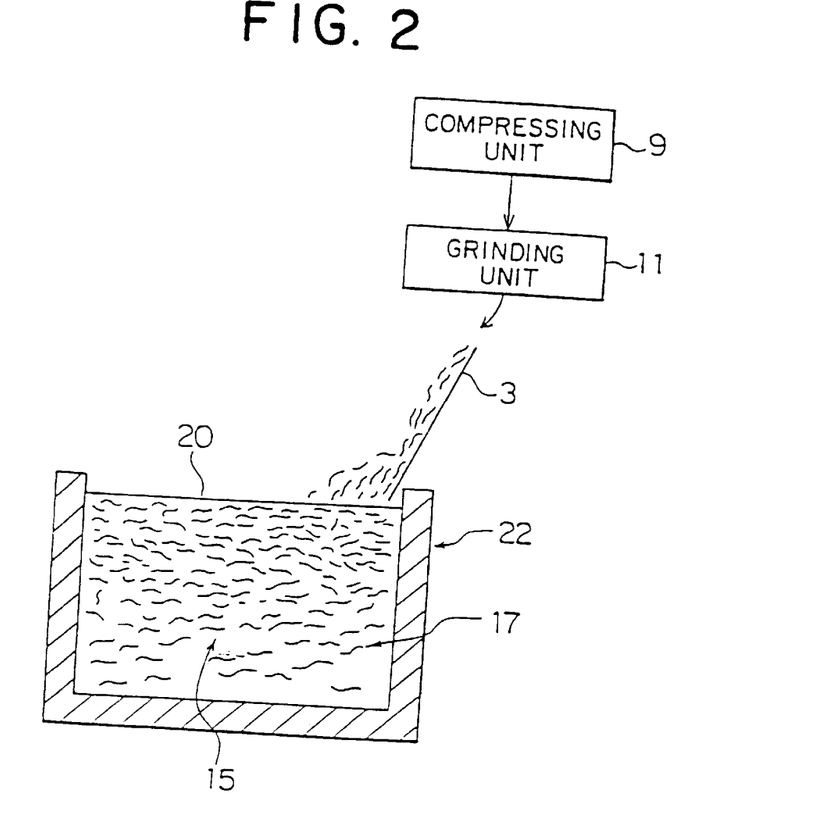
FIG. 2 is an illustration of one example of an apparatus that can be used for a water-immersion separating process taken in separating inner thin skin portions of a bamboo material from bamboo fibers in the third step of one method of producing a reinforcing bamboo fiber according to the present invention.

FIG. 2 shows one example of an apparatus suitable for the water-immersion separating method. The inner thin skin portion containing bamboo fibers obtained through a compressing unit 9 (first step) and a grinding unit 11 (second step) are led from a chute 3 into a water tank 22 accommodating water 17 to be soaked into the fibers 15. The inner thin skin portion 20 mixed into the bamboo fibers 15 float in the form of small pieces on the surface of the water 17 so as to be readily removable, which allows easy separation between the bamboo fibers 15 and the inner thin skin portion 20. The circulation of the water or the bamboo fibers within the water tank can facilitate the separation of the inner thin skin portion. In addition, decantation is useful for the separation of the inner thin skin portion in the water-immersion separating method. For the decantation, there is a method in which a water inlet is provided at one portion of the water tank while a water outlet is provided at the opposite side thereof.

When the inner thin skin portion mixed in the bamboo fibers are separated in accordance with the water-immersion separating method in the third step, where bamboo fibers are to be used as a reinforcing material for an inorganic molded body by reducing the moisture content of the bamboo fibers to more than 50%, preferably by adjusting the moisture content after the dehydration to within the range of 50 to 200%, with the result that, excellent moldability can be obtained when mixing, kneading and shaping of a mixture containing reinforcing fibers and cement, and at the same time the lowering of strength due to spring back after the shaping can be prevented. If the moisture content of the reinforcing bamboo fibers is lowered to less than 50%, the resultant bamboo fibers can not practically achieve improved effects. Moreover, if the moisture content of the obtained reinforcing bamboo fibers is less than 50%, it is difficult for the bamboo fiber surface to be evenly covered with the powdered raw material in the mixing process. To avoid this problem, the necessity to again add water arises, thus becoming an irrational manufacturing step. Still further, if the moisture content exceeds 200%, the powder evenly covering the surface of the bamboo fibers moves with the movement of moisture in the raw material mat during compression of the shaped raw material mat. As a result, there arises the undesirable problem that the ratio of the powdered raw material may be low at the upper surface portion of the molded body and high at the lower portion thereof.

Various methods can be used for dehydration, while pressure dehydration, centrifuge separation and the like are preferable. In pressure dehydration the degree of pressure is not particularly limited. In addition, where pressure dehydration alone cannot reduce the moisture content of the reinforcing bamboo fibers to more than 50%, it is also appropriate to use it in combination with another dehydration method such as drying.

By adjusting the moisture content of the reinforcing bamboo fibers after the water-immersion separation to within the range of 50 to 200%, the amount of water needed for kneading with other raw materials such as a cement, i.e., the moisture amount required for an inorganic molded body, is already in the reinforcing bamboo fibers, although the further addition of water is also possible for facilitating the mixing and shaping processes, if required.

In the present invention, there is no particular limitation imposed on the kind of bamboo material used.

Furthermore, the method of producing reinforcing bamboo fibers according to this invention is also applicable to producing bamboo flakes.

The reinforcing bamboo fiber containing inorganic molded body according to the present invention is characterized in that a given amount of water is added to a raw material mixture containing an inorganic hydraulic setting bonding agent and the reinforcing bamboo fibers obtained through the above-described producing method (1) and the water-added mixture is then kneaded or the raw material mixture is kneaded with no addition of water, before the resultant mixture is shaped, then cured and hardened.

In addition, in accordance with another embodiment, the reinforcing bamboo fiber containing inorganic molded body according to the present invention is also characterized in that a raw material mixture containing an inorganic hydraulic setting bonding agent and the reinforcing bamboo fibers obtained through the above-described producing method (2) are kneaded, before the resultant mixture is shaped, then cured and hardened.

Moreover, in accordance with a further embodiment, the reinforcing bamboo fiber containing inorganic molded body according to the present invention is characterized in that a raw material mixture containing an inorganic hydraulic setting bonding agent and the reinforcing bamboo fibers obtained through the above-described producing method (3) are kneaded, before the resultant mixture is shaped, then cured and hardened.

As the inorganic hydraulic setting bonding agents usable for manufacturing the reinforcing bamboo fiber containing inorganic molded bodies according to the present invention, there are, for example, various kinds of cements such as common Portland cement, quick setting cement, slag cement, and fly ash cement, as well as hydraulic setting gypsum.

The content of the reinforcing bamboo fibers is 15 to 45% by weight (dry weight), while the content of the inorganic hydraulic setting bonding agent is 45 to 85% by weight. In this instance, if the total amount of the reinforcing bamboo fibers and the inorganic hydraulic setting bonding agent is less than 100% by weight, it is possible to blend fillers as will be described hereinafter. When the blending rate of the reinforcing bamboo fibers is below 15% by weight, the strength of the molded body lowers due to the shortage of reinforcing bamboo fibers. On the other hand, if this exceeds 45% by weight, the blending rate of the reinforcing bamboo fibers becomes excessive relative to the powdered raw material, whereupon it becomes difficult to completely and evenly cover the surface of the reinforcing bamboo fibers with the powdered raw material in the mixing step, lowering the strength of the inorganic molded body.

In addition to the essential components of the reinforcing bamboo fibers and the inorganic hydraulic setting bonding agent, the reinforcing bamboo fiber containing inorganic molded body can further contain the following materials, if needed, to such an extent that they do not affect the properties of the inorganic molded body and the moldability of the raw material mixture. Such materials that may be included are:

(1) fibers, flakes, powders and the like of raw plant materials (woody material such as from conifers and broad-leaved trees as well as hemp, cotton, chaff, etc.) other than of bamboo;

(Although the ratio of the bamboo material to the other raw plant material is not particularly restricted, in view of the object of the present invention, it is preferable to use as much reinforcing bamboo fiber as possible.)

(2) needle-like crystals such as wollastonite;
(3) plate-like crystals such as mica;
(4) mineral powders such as silica hume, diatomaceous earth, fly ash;
(5) extending agents such as calcium carbonate, pearlite and styrene particulates;
(6) clay minerals such as bentonite, kaolin and vermiculite;
(7) fiber-like minerals such as palygorskite and sepiolite;
(8) porous mineral powders such as zeolite;
(9) synthetic resin emulsions; and
(10) additives such an coloring agents, waterproofing agents, hardening accelerators and hardening retardants.

The components listed in (2) to (8) are usable as a whole up to 35% by weight of the total amount of the raw material mixture not containing moisture. Further, the component indicated by (9) is preferably used up to 10% by weight of the entire amount of the raw materials not containing water. Still further, of the components indicated by (10), both the coloring and waterproofing agents are desirably less than 5% by weight of the whole amount of the raw materials, while it is possible that both the hardening accelerator and hardening retardant can be added up to 8% by weight relative to the inorganic hydraulic setting bonding agent.

The reinforcing bamboo fiber containing inorganic molded body according to the present invention can be manufactured in such a way that a given amount of water is provided to a raw material mixture with the aforesaid blending conditions and the mixture is kneaded or, if the water contained in the reinforcing bamboo material reaches the necessary amount, the mixture is kneaded without the addition of water, before the resultant kneaded mixture is shaped and cured.

The mixing apparatus to be used for the mixing of the reinforcing bamboo fibers, the inorganic hydraulic setting bonding agent and the other raw materials is not limited to any specific type, but conventional mixing apparatus are acceptable. However, there is a need for the mixing to be accomplished without destroying the shape of the reinforcing bamboo fibers. In this respect, a mixing apparatus as shown in FIG. 3 as disclosed in Japanese Patent Laid-Open No. 6-327956, is desirable.

Figure 3:
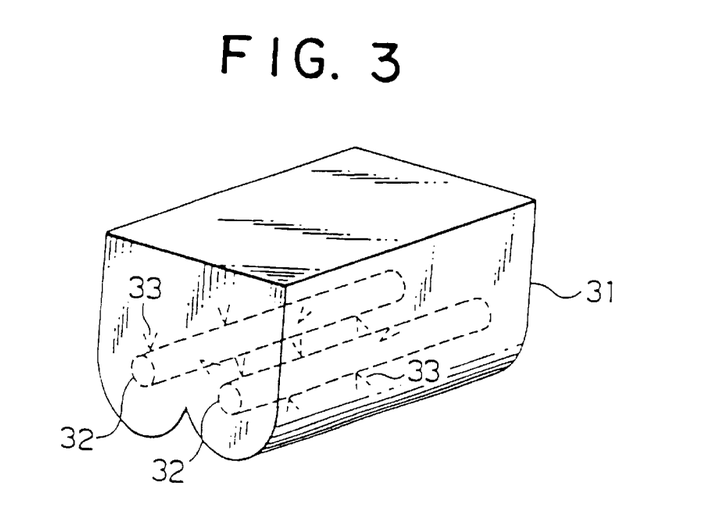
FIG. 3 is an illustration of one example of a mixing apparatus that can be used for mixing reinforcing bamboo fibers and other raw materials to obtain a raw material mixture in manufacturing a reinforcing bamboo fiber containing inorganic molded body according to the present invention.

The FIG. 3 mixing apparatus has two main shafts 32 housed in a mixing vessel 31 and arranged to be rotatable in opposite directions. Each of the surfaces of these two main shafts 32 has a number of mixing pins 33 extending at right angles to the circumferential directions thereof, Each of the mixing pins 33 has a V-like or Y-like configuration whereby the reinforcing bamboo fibers can be evenly mixed with the other raw materials without applying a large load to the reinforcing bamboo fibers, i.e., without destroying the shape of the reinforcing bamboo fibers. However, the mixing means in this invention is not limited to the aforementioned mixing apparatus.

In addition, for the shaping of the raw material mixture, a well-known shaping apparatus for cement chip boards, various press formations and so on are useful. However, limitation is not particularly imposed on the shaping means in this invention. For example, it is also possible to use the apparatus as shown in FIG. 4 and disclosed in Japanese Patent Laid-Open No. 6-15628.

Figure 4:
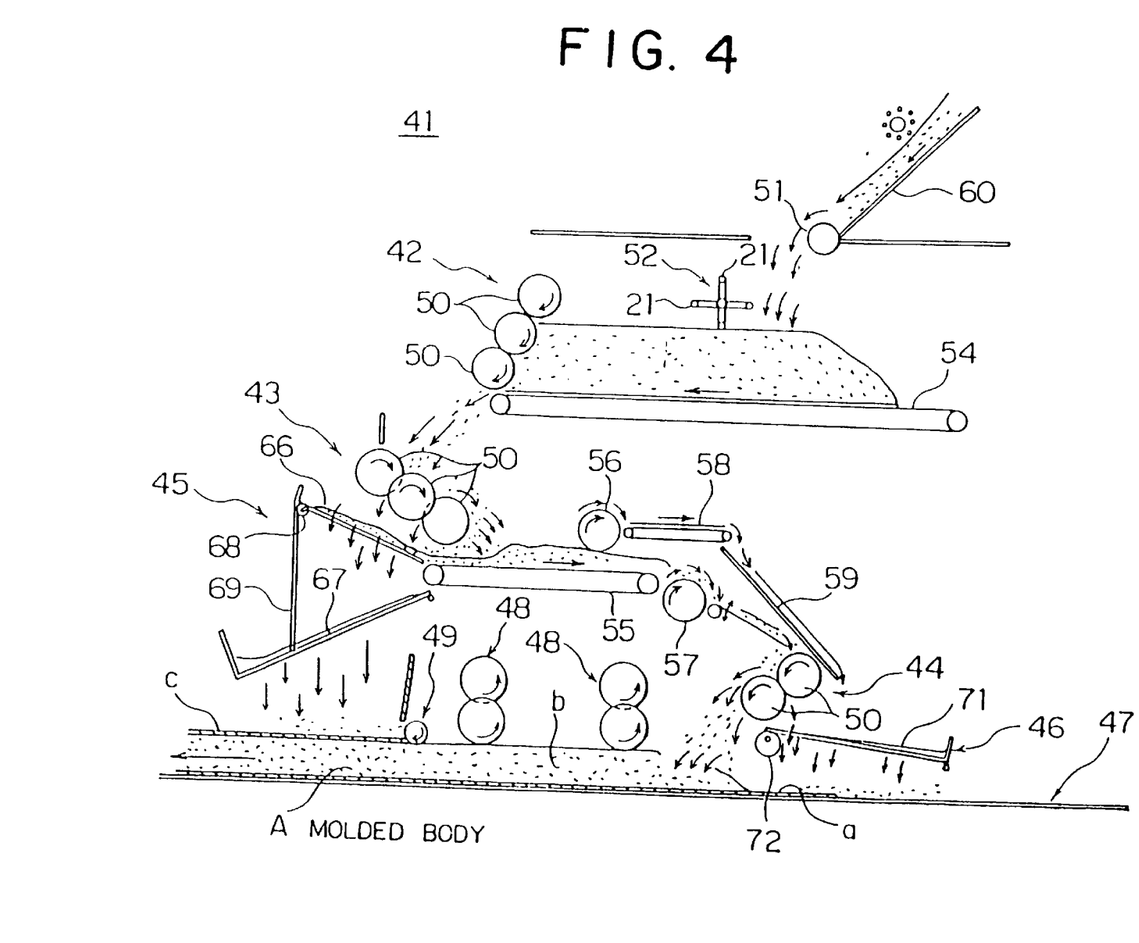
FIG. 4 is an illustration of one example of a mixing apparatus that can be used for shaping a raw material mixture in manufacturing a reinforcing bamboo fiber containing inorganic molded body according to the present invention.

The FIG. 4 shaping apparatus, generally designated by reference numeral 41, basically comprises three pin type roller sets 42, 43, 44, separating units 45, 46 placed at the raw material input side of the second pin type roller set 43 for separation of fine fiber components, a shaping conveyer 47 carrying a thin steel plate or flat plate for receiving a raw material mixture, which drops and is supplied by means of the three pin type roller sets 42, 43, 44, and finish rollers 48 and a compressing roller 49 for shaping the raw material mixture supplied on the shaping conveyer 47 into a mat-like configuration. Also included in the FIG. 4 apparatus 41 are a raw material input roller 51 for supplying the raw material mixture, a rotary brush 52, a first raw material feed conveyer 54, a second raw material feed conveyer 55, a raw material adjusting roller 56 and a raw material feed roller 57.

In operation, the raw material mixture kneaded with a given amount of water or kneaded with the water contained in the reinforcing bamboo fibers per se is supplied through a vibrating receiving plate 60 to the raw material input roller 51, and further led onto the first raw material feed conveyer 54. Here, the upper surface of the raw material mixture is flattened by means of the rotary brush 52, and the raw material mixture is carried toward the first pin type roller set 42 located at a raw material discharging portion of the first raw material feed conveyer 54. At this time, this first pin type roller set 42 serves as a raw material scraping roller. The raw material mixture supplied from the first pin type roller set 42 to the second pin type roller set 43 is evenly distributed in quantity through a plurality of successively arranged pin type rollers 50, before being supplied to the second raw material feed conveyer 55. At this time, a portion of the raw material mixture drops through gaps between the adjacent rollers 50 of the second pin type roller set 43 and arrives on the separating unit 45 comprising sieves or wire nets 66, 67 placed below the second pin type roller set 43. The separating unit 45 is made to vibrate by the help of, for example, a combination of a cam 68 and a rod 69, with the result that ultra-fine reinforcing bamboo fibers or fine reinforcing bamboo fibers are separated from the raw material mixture on the sieve or wire net 66 and drop onto the raw material mixture already piled up on the lowermost shaping conveyer 47 so as to form a top layer, i.e., a third layer made of fine fibers.

A portion of the raw material mixture carried with the second raw material conveyer 55 is led, by means of the raw material adjusting roller 56, from another conveyer 58 and a chute 59 to a second separating unit 46 comprising a wire net 71 and a cam 72 where ultra-fine and fine reinforcing bamboo fibers are separated therefrom. With this separating unit 46, the ultra-fine reinforcing bamboo fibers first drop onto the thin-steel plate or flat-plate carrying shaping conveyer 47, before the fine reinforcing bamboo fibers subsequently drop thereon, thus forming a first thin layer a as illustrated.

Furthermore, the raw material mixture is averaged in quantity and mixed up by means of the raw material adjusting roller 56 when lying on the second raw material feed conveyer 55 and, at the same time, carried through the second raw material feed conveyer 55 so as to be let through the raw material feed roller 57 located at the raw material discharging side to the third pin type roller set 44 comprising a plurality of successively arranged pin type rollers 50 acting as forming rollers. The raw material mixture coming to the pin type roller set 44 is further averaged in quantity through the pin type rollers 50 and drops on the first layer a previously formed on the shaping conveyer 47 so as to form a second layer b on the first layer a. Subsequently, the pairs of finish rollers 48 flatten the second layer b, on which the aforesaid third fiber layer c is piled up. Thereafter, the compressing roller 49 compresses these layers, finally fabricating the reinforcing fiber containing inorganic molded body.

A plurality of molded bodies each thus formed on the thin steel plate or flat plate can, if required, be piled up and shaped under a given pressure. Although described with reference to the FIG. 4 apparatus, the present invention is not limited to the method of using this apparatus.

Depending upon the kinds of inorganic hydraulic setting bonding agents, natural curing or steam curing is suitable for the curing operation of the inorganic molded body. Further, curing based on an autoclave is not very desirable. This is because the reinforcing bamboo fibers for a reinforcing bamboo fiber containing inorganic molded body according to the present invention are not pulped and hence, if cured in an autoclave, the resin components contained in the reinforcing bamboo fibers can change in quality and deteriorate.

Having generally described this invention, a further understanding can be obtained by reference to certain specific examples which are provided herein for purposes of illustration only and are not intended to be limiting unless otherwise specified.

EXAMPLES

A detailed description will be made hereinbelow in terms of reinforcing bamboo fibers and inorganic molded bodies containing the reinforcing bamboo fibers according to embodiments of the present invention.

Example 1

Example of Producing Reinforcing Bamboo Fibers (1) In a first step (roller compression step) of compressing a bamboo material to roughly crush it, the specification of the roller used is as follows.

| roller material | carbon steel (S45C) |
| --- | --- |
| roller diameter | φ 150 mm |
| roller length (effective length) | 500 mm |

A compressing unit equipped with such rollers as noted above treated the bamboo material under the following conditions: 417 kg/cm of pressure, 15 m per minute of roller feed speed, 180 kg per hour of throughput. For obtaining the bamboo material used, cut down bamboo trees underwent leaf removal and were cut transversely to have a length of approximately 70 cm before being cut longitudinally to have a width of approximately 3 cm. The moisture content of this bamboo material was about 110%.

Through the completion of this first step, the bamboo material was split or broken in a bundle along the direction of bamboo growth and developed a number of cracks or splits extending along the bamboo growth direction, with the cracks being spaced approximately 0.1 to 3.0 mm from each other.

The moisture content of the bamboo material after the completion of the first step was approximately 60%.

(2) In a second step of fiberizing the roughly crushed bamboo material using a grinding machine, the hammermill type grinding machine was used.

Using an MHM vertical type grinding machine manufactured by Miike Tekkosho K. K. a 20 mm mesh screen was placed at the bottom portion of the grinding machine, with the result that reinforcing bamboo fibers whose average length was approximately 20 mm were produced when the grinding machine was operated at 30 horsepower for 2 hours.

Next, the resultant reinforcing bamboo fibers were dried at a temperature of 100° C. to adjust their moisture content to within the range of 18±5%, thus resulting in reinforcing bamboo fibers (average length: 20 mm).

Example 2

Example of Producing Reinforcing Bamboo Fiber Containing Inorganic Molded Body

A raw material mixture was produced using the reinforcing bamboo fibers obtained in the foregoing Example 1. The raw material mixture comprised 30% by dry weight of the reinforcing bamboo fibers, 70% by weight of a common Portland cement, 45% by weight of water relative to when the dry weight of these two kinds of raw materials is 100, and 4% by weight of magnesium chloride serving as a hardening accelerator relative to the total dry weight of the raw materials. For the mixing of these materials, the magnesium chloride was dissolved in water and the resultant magnesium chloride water solution was subsequently sprayed toward the reinforcing bamboo fibers and mixed therewith and finally the common Portland cement was added thereto.

The obtained mixture was formed into a uniform mat-like configuration on an iron plate, and then pressurized at 18 kg/cm$^2$ and fixed with a turnbuckle. In this state, the mixture was initially cured for 24 hours, and subsequently naturally cured for 2 weeks after the turnbuckle was detached and the iron plate was removed, thus obtaining a reinforcing bamboo fiber containing inorganic molded body with a dimension of 25 cm×25 cm×18 mm. At this time, slight spring back was found in the obtained inorganic molded body.

The properties of the obtained reinforcing bamboo fiber containing inorganic molded body were as follows.

| initial values: | bulk specific gravity | 1.0 |
| --- | --- | --- |
| | flexural strength (in a state dried at a temperature of 60° C. for 24 hours) | 85 kg/cm$^2$ |

A sample was experimentally installed on an outer wall of a warehouse in a non-coated state. The properties of the sample after the elapse of one year were as follows (the moisture content of the compact at the time of the installation was 13%).

| bulk specific gravity | 1.0 |
| --- | --- |
| flexural strength (in a state dried at a temperature of 60° C. for 24 hours) | 84 kg/cm$^2$ |

As obvious from these values, the difference between the previous flexural strength and the later flexural strength can be accounted for by measurement error and, hence, no significant differences took place.

Example 3

Example of Producing Reinforcing Bamboo Fibers

The bamboo material (moisture content approximately 60%) subjected to the first step (compressing step of roughly crushing the bamboo material) similar to that in the foregoing Example 1 under the same conditions was dried at a temperature of 100° C. so that its moisture content was adjusted to within the range of 18±5%.

Subsequently, the bamboo material was fiberized in the same manner as in the second step of Example 1. The resultant fibers had an average fiber length of approximately 20 mm.

Thereafter, these reinforcing bamboo fibers were processed to absorb ground water (industrial water) so as to have a 300% moisture content. Following this processing, the reinforcing bamboo fibers were compressed and dehydrated under a pressure of 10 kg/cm$^2$ so that their moisture content was lowered by 140%, thus obtaining reinforcing bamboo fibers with 160% moisture content.

Example 4

Example of Producing Reinforcing Bamboo Fiber Containing Inorganic Molded Body

A mixture was made with 30% by weight (in absolute dry weight conversion) of the reinforcing bamboo fibers obtained in Example 3 and 70% by weight of a common Portland cement, before being evenly formed into a mat-like shape on an iron plate. The resultant mat-like mixture was pressurized at 18 kg/cm$^2$ and fixed with a turnbuckle, and then cured for 24 hours. Subsequently, the turnbuckle was detached and the iron plate was removed, before being naturally cured for 2 weeks, with the obtained reinforcing bamboo fiber containing inorganic molded body having a dimension of 25 cm×25 cm×18 mm (thickness). This resultant inorganic molded body did not show any spring back.

The properties of the obtained reinforcing bamboo fiber containing inorganic molded body were as follows.

| initial values: | bulk specific gravity | 1.1 |
| --- | --- | --- |
| | flexural strength (in a state dried at a temperature of 60° C. for 24 hours) | 114 kg/cm$^2$ |
| after one year: | bulk specific gravity | 1.1 |
| | flexural strength (in a state dried at a temperature of 60° C. for 24 hours) | 115 kg/cm$^2$ |

As obvious from the above values, the flexural strength did not lower irrespective of the elapse of one year.

Example 5

Example of Producing Reinforcing Bamboo Fibers

A bamboo material was compressed and roughly crushed in the same way as in the foregoing Example 1, before being fiberized by means of a grinding machine, thus providing reinforcing bamboo fibers whose average fiber length was approximately 20 mm.

In the third step of separating inner thin skin portion of the bamboo material, the inner thin skin portion was separated and removed therefrom using the FIG. 1 apparatus to provide bamboo fibers. The obtained bamboo fibers had a moisture content of approximately 40%.

Secondly, these bamboo fibers were dried at a temperature of 60° C. so that the moisture content was adjusted to be within the range of 18±5%, to obtain reinforcing bamboo fibers (average fiber length: 20 mm).

Example 6

Example of Producing Reinforcing Bamboo Fiber Containing Inorganic Molded Body

A raw material mixture was produced using the reinforcing bamboo fibers obtained in the foregoing Example 5. The raw material mixture comprised 30% by dry weight (absolute dry weight conversion) of the reinforcing bamboo fibers, 70% by weight of a common Portland cement, 45% by weight of water relative to when the dry weight of these two kinds of raw materials is 100, and 4% by weight of magnesium chloride serving as a hardening accelerator relative to the total dry weight of the raw materials. For the mixing of these materials, the magnesium chloride was dissolved in water and the resultant magnesium chloride water solution was subsequently sprayed toward the reinforcing bamboo fibers and mixed therewith and finally the common Portland cement was added thereto.

The obtained mixture was formed into a uniform mat-like configuration on an iron plate, and then pressurized at 18 kg/cm$^2$ and fixed with a turnbuckle. In this state, the mixture was initially cured for 24 hours, and subsequently naturally cured for 2 weeks after the turnbuckle was detached and the iron plate was removed, thus resulting in a reinforcing bamboo fiber containing inorganic molded body with a dimension of 25 cm×25 cm×12 mm. At this time, slight spring back was found in the inorganic molded body.

The properties of the obtained reinforcing bamboo fiber containing inorganic molded body were as follows.

| initial values: | bulk specific gravity | 1.0 |
| --- | --- | --- |
| | flexural strength (in a state dried at a temperature of 60° C. for 24 hours) | 98 kg/cm$^2$ |

A sample was experimentally installed on an outer wall of a warehouse in a non-coated state. The properties of the sample after the elapse of one year were as follows.

| bulk specific gravity | 1.0 |
| --- | --- |
| flexural strength | (in a state dried at a temperature of 60° C. for 24 hours) 95 kg/cm$^2$ |

As obvious from these values, the difference between the previous flexural strength and the later flexural strength can be accounted for by measurement error and, hence, no significant differences took place.

Example 7

Example of Producing Reinforcing Bamboo Fibers

The bamboo material was compressed and roughly crushed in the same manner as in the foregoing Example 1, before being dried at a temperature of 60° C. so that its moisture content was adjusted to within the range of 18±5%. Subsequently, the roughly crushed bamboo material (with the already adjusted moisture content) was fiberized using a grinding machine in the same manner as in the foregoing Example 1. The resultant fibers had an average fiber length of approximately 20 mm.

Thereafter, the third step of separating inner thin skin portion of the bamboo material was taken using the water-immersion separation method illustrated in FIG. 2. In this third step, the obtained bamboo fibers were soaked in water and small pieces of inner thin skin portion floating on the surface of the water were removed. In this step, ground water was put into the water tank.

The moisture content of the inner thin skin portion removed bamboo fibers was measured and found to be approximately 830%. (However, the measurement error was large, as the measurement was made with the bamboo dripping wet). The bamboo fibers were compressed and dehydrated under a pressure of 15 kg/cm$^2$ to obtain reinforcing bamboo fibers (average length: 20 mm) whose moisture content came to approximately 100%.

Example 8

Example of Producing Reinforcing Bamboo Fiber Containing Inorganic Molded Body

Using the FIG. 3 mixing apparatus, a mixture was made with 30% by weight (absolute dry weight conversion) of the reinforcing bamboo fibers obtained in the aforesaid Example 7 and 70% by weight of a common Portland cement.

Subsequently, the obtained raw material mixture was put in the FIG. 4 apparatus so as to be evenly shaped into a raw material mat with a thickness of approximately 15 cm on an iron plate having a dimension of 1220 mm×2440 mm. Further, 30 raw material mats were formed in the same way and piled up together with the associated iron plates, before being pressurized under a pressure of 18 kg/cm² and fixed with a turnbuckle, then cured for 24 hours so that the common Portland cement hardened.

Following these processes, the turnbuckle was detached and the iron plates were taken out, and subsequently the raw material mixture was then naturally cured for 2 weeks. After the natural curing, the raw material mixture was dried so that its moisture content represented approximately 12%, before being cut off to provide a reinforcing bamboo fiber containing inorganic molded body having a width of 910 mm, a length of 1820 mm, and a thickness of 18 mm.

The properties of the obtained reinforcing bamboo fiber containing inorganic molded body were as follows.

| initial values: | bulk specific gravity | 1.1 |
| --- | --- | --- |
| | flexural strength (in a state dried at a temperature of 60° C. for 24 hours) | 132 kg/cm² |

A sample was experimentally used as an external wall material in a non-coated state. The properties of the sample after the elapse of one year were as follows.

| bulk specific gravity | 1.1 |
| --- | --- |
| flexural strength | (in a state dried at a temperature of 60° C. for 24 hours) 130 kg/cm² |

As obvious from these values, the difference between the previous flexural strength and the later flexural strength can be accounted for by measurement error and, hence, no significant differences took place. Cracks did not occur at screw-fitting portions in use as an external wall material.

Example 9

Example of Producing Reinforcing Bamboo Fiber Containing Inorganic Molded Body

A reinforcing bamboo fiber containing inorganic molded body was manufactured in the same manner as in Example 6 except that the mixture was obtained with 25% by weight (absolute dry weight conversion) of the reinforcing bamboo fibers obtained in Example 7, 20% by weight of a wollastonite and 55% by weight of a common Portland cement.

The properties of the obtained reinforcing bamboo fiber containing inorganic molded body were as follows.

| initial values: | bulk specific gravity | 1.1 |
| --- | --- | --- |
| | flexural strength (in a state dried at a temperature of 60° C. for 24 hours) | 123 kg/cm² |

A sample of the inorganic molded body was experimentally left as is in a warehouse in a palletized state. The properties of the sample after the elapse of half a year were as follows.

| bulk specific gravity | 1.1 |
| --- | --- |
| flexural strength | (in a state dried at a temperature of 60° C. for 24 hours) 124 kg/cm² |

Deterioration of the flexural strength of the sample did not take place.

Comparative Example 1

Bamboo fibers were obtained in the same manner as in Example 1 except that the drying process was not used for the adjustment of the moisture content.

Further, an inorganic molded body was manufactured using the obtained bamboo fibers in the same way as in Example 2. At the time of manufacturing the molded body, the moisture content of the bamboo fibers was approximately 45%.

The properties of the obtained reinforcing bamboo fiber containing inorganic molded body were as follows.

| initial values: | bulk specific gravity | 1.0 |
| --- | --- | --- |
| | flexural strength (in a state dried at a temperature of 60° C. for 24 hours) | 83 kg/cm² |

A sample of the inorganic molded body was experimentally exposed to open air for one year. The properties of the sample after the lapse of one year were as follows.

| bulk specific gravity | 1.0 |
| --- | --- |
| flexural strength | (in a state dried at a temperature of 60° C. for 24 hours) 66 kg/cm² |

At this time, it was found that the flexural strength had lowered.

Comparative Example 2

Bamboo fibers were obtained in the same manner as in Example 5 except that the drying process was not used for the adjustment of the moisture content after the inner thin skin portion was separated and removed using the FIG. 1 apparatus. The moisture content of the obtained bamboo fibers was approximately 40%.

Using these bamboo fibers, an inorganic molded body was manufactured in the same way as in Example 6.

The properties of the obtained reinforcing bamboo fiber containing inorganic molded body were as follows.

| | | |
|---|---|---|
| initial values: | bulk specific gravity | 1.0 |
| flexural strength | (in a state dried at a temperature of 60° C. for 24 hours) | 95 kg/cm² |

A sample of the inorganic molded body was experimentally installed on an external wall of a warehouse in a non-coated state so as to be exposed to open air for one year. The properties of the sample after the elapse of one year were as follows.

| | |
|---|---|
| bulk specific gravity | 0.9 |
| flexural strength | (in a state dried at a temperature of 60° C. for 24 hours) 69 kg/cm² |

At this time, it was found that the the flexural strength became lower than the initial value.

Comparative Example 3

Bamboo fibers were obtained by the same manner as in Example 7, except that the drying process was not taken to adjust the moisture content after the completion of the first step, and an inorganic molded body was manufactured with the same blending rates as in Example 8 except that the above bamboo fibers were used.

The properties of the obtained reinforcing bamboo fiber containing inorganic molded body were as follows.

| | | |
|---|---|---|
| initial values: | bulk specific gravity | 1.1 |
| | flexural strength (in a state dried at a temperature of 60° C. for 24 hours) | 123 kg/cm² |

A sample of the inorganic molded body was experimentally used as an external wall material in a non-coated state. The properties of the sample after the elapse of one year were as follows.

| | |
|---|---|
| bulk specific gravity | 1.1 |
| flexural strength | (in a state dried at a temperature of 60° C. for 24 hours) 104 kg/cm² |

At this time, it was found that the flexural strength became lower than the initial value. In addition, cracks occurred at three screw-fitting portions when used as an external wall material.

Comparative Example 4

An inorganic molded body was manufactured in the same manner as in Example 9 except that the bamboo fibers produced in Comparative Example 3 were used.

The properties of the obtained reinforcing bamboo fiber containing inorganic molded body were as follows.

| | | |
|---|---|---|
| initial values: | bulk specific gravity | 1.1 |
| | flexural strength (in a state dried at a temperature of 60° C. for 24 hours) | 118 kg/cm² |

A sample of the inorganic molded body was experimentally left as is in a warehouse in a palletized state. The properties of the sample after the elapse of half a year were as follows.

| | |
|---|---|
| bulk specific gravity | 1.1 |
| flexural strength | (in a state dried at a temperature of 60° C. for 24 hours) 92 kg/cm² |

A deterioration of the flexural strength took place relative to the initial value.

Comparative Example 5

Bamboo material having a length of approximately 70 cm and a width of approximately 3 cm and further having a moisture content of approximately 60% was roller-compressed to be roughly crushed, with the result that not only the bamboo material was split in a bundle along the direction of bamboo growth but also a portion of the bamboo material was fragmented and another portion thereof was also split in a direction obliquely crossing the bamboo growth direction. The moisture content of the bamboo material after the roller compression was approximately 45%.

Subsequently, this bamboo material was dried at a temperature of 60° C. so that its moisture content was adjusted to within the range of 18±5%, before being fiberized under the same conditions as in Example 5.

Based upon visual inspection of the obtained bamboo fibers, there were more non-fiberized portions in the bamboo fibers than those in Example 5. In addition, the amount of dust generated in the fiberizing process of the bamboo material and collected with a dust collector attached to the grinding machine was larger by approximately 10% by weight than that in Example 5. This means that the yield of the bamboo fibers was lower than that in Example 5.

The inner thin skin portion was removed from the bamboo fibers under the same conditions as in the third step of Example 7, to result in bamboo fibers with a moisture content of approximately 100%. It was found that, when the inner thin skin portion was removed, a portion of the non-fiberized bamboo fragments was also removed.

Using the bamboo fibers thus obtained, a bamboo fiber cement test piece having a dimension of 30 cm×30 cm×10 mm was made (under a forming pressure of 18 kg/cm²) and physical properties measured by means of a table test (laboratory test) under the conditions of bamboo fiber (by dry weight): cement=30:70. The properties after curing for 2 weeks were a bulk specific gravity of 1.1 and a flexural strength of 104 kg/cm².

When using the reinforcing bamboo fibers obtained in Example 7 a test piece was fabricated and physical properties measured under the same conditions. The measurement showed that the bulk specific gravity was 1.1 and the flexural strength was 135 kg/cm². The flexural strength was positively different from the initial value in contrast to the case of using the reinforcing bamboo fibers obtained in Example 7.

Comparative Example 6

A first step was taken under the same conditions as in Example 7, and after the completion of the first step, the resultant bamboo material was substantially dried completely at a temperature of approximately 105° C., before being fiberized under the same conditions as in Example 7. The resultant bamboo fibers were easier to powder as compared with the bamboo fibers obtained in Example 7 and powder-like bamboo materials were collected in a dust collector attached to the grinding machine. The amount of dust generated during the fiberizing process of the bamboo material increased approximately 35% by dry weight as compared with that in Example 7.

Comparative Example 7

A first step was taken under the same conditions as in Example 7, and after the completion of the first step, the resultant bamboo material was wind-dried to a moisture content of approximately 45%, before being subjected to the second and third steps, thereby providing bamboo fibers with a moisture content of approximately 100%.

Thereafter, an inorganic molded body was manufactured under the same conditions as in Example 8. When the state of the raw material was visually observed in the mixing of the bamboo fibers and a cement, the bamboo fibers were intertwined with each other to form balls each having a diameter of approximately 5 mm, which did not permit the cement to be evenly attached onto the whole surface of the bamboo fibers.

After the formation, the mixture wag naturally cured for 2 weeks and then dried under the same conditions as in Example 1 and cut, thereby providing a bamboo fiber containing inorganic molded body.

The properties of the obtained reinforcing bamboo fiber containing inorganic molded body were as follows.

| initial values: | bulk specific gravity | 1.2 |
| --- | --- | --- |
| | flexural strength (in a state dried at a temperature of 60° C. for 24 hours) | 125 kg/cm$^2$ |

A sample of the inorganic molded body was experimentally used as an external wall material in a non-coated state. The properties of the sample after the elapse of one year were as follows.

| bulk specific gravity | 1.2 |
| --- | --- |
| flexural strength | (in a state dried at a temperature of 60° C. for 24 hours) 110 kg/cm$^2$ |

Cracks occurred at two screw-fitting portions when used as an external wall material.

Accordingly, the present invention can provide a reinforcing bamboo fiber containing inorganic molded body which has less variation of quality with the passage of time and which is capable of improved durability.

The disclosure in Japan Patent Application No. 7-173633, filed Jul. 10, 1995, is hereby incorporated by reference.

What is claimed as new and is desired to be secured by Letters Patent of the United States is:

1. A reinforcing bamboo fiber produced in accordance with a method comprising:
   (1) compressing a bamboo material having a moisture content above 65% to roughly crush it;
   (2) fiberizing the roughly crushed bamboo material using a grinding machine to form bamboo fibers of said bamboo material; and
   (3) after the completion of at least one of said step (1) and said step (2), drying said bamboo material to a moisture content within the range of 3 to 35%, whereby said reinforcing bamboo fibers are formed, wherein moisture content is defined as ((water-containing weight-dry weight)/dry weight)×100.

2. A reinforcing bamboo fiber in accordance with claim 1, wherein the reinforcing bamboo fibers are further processed to absorb water so that their moisture content reaches more than 100%, which fibers are then dehydrated so that their moisture content is reduced by more than 50%, wherein the resultant moisture content is in the range of 50 to 200%.

3. A reinforcing bamboo fiber produced in accordance with a method comprising:
   (1) compressing a bamboo material having a moisture content above 65% to roughly crush it;
   (2) fiberizing the roughly crushed bamboo material using a grinding machine; and
   (3) removing the inner thin skin portion of said bamboo material by mechanical separation; and
   (4) after the completion of at least one of said step (1) said step (2), and said step (3), drying said bamboo material to a moisture content within the range of 3 to 35%.

4. A reinforcing bamboo fiber produced in accordance with a method comprising:
   (1) compressing a bamboo material having an inner thin skin portion and having a moisture content above 65% to roughly crush it;
   (2) fiberizing the roughly crushed bamboo material using a grinding machine to form bamboo fibers of said bamboo material;
   (3) removing the inner thin skin portion of said bamboo material by water-immersion separation;
   (4) after the completion of at least one of said step (1) and said step (2), drying said bamboo material to a moisture content within the range of 3 to 35%, whereby said reinforcing bamboo fibers are formed, wherein moisture content is defined as ((water-containing weight-dry weight)/dry weight)×100.

5. A reinforcing bamboo fiber in accordance with claim 4, wherein after the removal of said inner thin skin portion, the bamboo fibers are dehydrated so that their moisture content is reduced by more than 50%, wherein the resultant moisture content is in the range of 50 to 200%.

6. A reinforcing bamboo fiber containing inorganic molded body manufactured in accordance with a method comprising kneading a raw material mixture containing an inorganic hydraulic setting bonding agent and reinforcing bamboo fibers produced in accordance with claim 1 with or without water, to form a shape, and then curing and hardening.

7. A reinforcing bamboo fiber containing inorganic molded body manufactured in accordance with a method comprising kneading a raw material mixture containing an inorganic hydraulic setting bonding agent and reinforcing bamboo fibers produced in accordance with claim 2 with or without water, to form a shape, and then curing and hardening.

8. A reinforcing bamboo fiber containing inorganic molded body manufactured in accordance with claim 6, wherein said inorganic hydraulic setting bonding agent is a cement.

9. A reinforcing bamboo fiber containing inorganic molded body manufactured in accordance with claim 7, wherein said inorganic hydraulic setting bonding agent is a cement.

10. A reinforcing bamboo fiber containing inorganic molded body manufactured in accordance with claim 6, wherein said raw material mixture contains a filler.

11. A reinforcing bamboo fiber containing inorganic molded body manufactured in accordance with claim 7, wherein said raw material mixture contains a filler.

12. A reinforcing bamboo fiber containing inorganic molded body manufactured in accordance with a method comprising kneading a raw material mixture containing an inorganic hydraulic setting bonding agent and reinforcing bamboo fibers produced in accordance with claim 3 with an amount of water to form a shape, and then curing and hardening.

13. A reinforcing bamboo fiber containing inorganic molded body manufactured in accordance with claim 12, wherein said inorganic hydraulic setting bonding agent is a cement.

14. A reinforcing bamboo fiber containing inorganic molded body manufactured in accordance with claim 13, wherein said raw material mixture contains a filler.

15. A reinforcing bamboo fiber containing inorganic molded body manufactured in accordance with a method comprising kneading a raw material mixture containing an inorganic hydraulic setting bonding agent and reinforcing bamboo fibers produced in accordance with the method defined in claim 4 to form a shape, and then curing and hardening.

16. A reinforcing bamboo fiber containing inorganic molded body manufactured in accordance with a method comprising kneading a raw material mixture containing an inorganic hydraulic setting bonding agent and reinforcing bamboo fibers produced in accordance with the method defined in claim 5 to form a shape, and then curing and hardening.

17. A reinforcing bamboo fiber containing inorganic molded body manufactured in accordance with claim 15, wherein said raw material mixture contains a filler.

18. A reinforcing bamboo fiber containing inorganic molded body manufactured in accordance with claim 16, wherein said raw material mixture contains a filler.

19. A reinforcing bamboo fiber in accordance with claim 3 wherein the reinforcing bamboo fibers are further processed to absorb water go that their moisture content reaches more than 100%, which fibers are then dehydrated so that their moisture content is reduced by more than 50%, wherein the resultant moisture content is in the range of 50 to 200%.

* * * * *

UNITED STATES PATENT AND TRADEMARK OFFICE
CERTIFICATE OF CORRECTION

PATENT NO. : 6,391,435 B1
DATED : May 21, 2002
INVENTOR(S) : Akiyama et al.

It is certified that error appears in the above-identified patent and that said Letters Patent is hereby corrected as shown below:

<u>Title page,</u>
Item [30], the Foreign Application Priority Data has been omitted. It should read:
-- [30]    Foreign Application Priority Data
Jul. 10, 1995    (JP) ………………………….. 7-173633 --

Signed and Sealed this

Eighth Day of October, 2002

*Attest:*

JAMES E. ROGAN
*Attesting Officer*    *Director of the United States Patent and Trademark Office*